US008807744B2

(12) United States Patent
Ng

(10) Patent No.: US 8,807,744 B2
(45) Date of Patent: Aug. 19, 2014

(54) EYEGLASS FRAME HAVING FLEXIBLE PIVOT HINGE

(71) Applicant: Dongguan Action Optic Resources Co., Ltd., Dong Guan (CN)

(72) Inventor: Choon Kheang Ng, Jalan Gangsa (MY)

(73) Assignee: Dongguan Action Optic Resources Co., Ltd., Dong Guan, Guang Dong Province (CN)

( * ) Notice: Subject to any disclaimer, the term of this patent is extended or adjusted under 35 U.S.C. 154(b) by 69 days.

(21) Appl. No.: 13/708,203

(22) Filed: Dec. 7, 2012

(65) Prior Publication Data

US 2014/0022503 A1 Jan. 23, 2014

(30) Foreign Application Priority Data

Jul. 17, 2012 (CN) .......................... 2012 2 0345074

(51) Int. Cl.
*G02C 5/22* (2006.01)

(52) U.S. Cl.
USPC ............................................ 351/153; 16/228

(58) Field of Classification Search
USPC ............. 351/153, 116, 111, 113, 119; 16/228
See application file for complete search history.

(56) References Cited

U.S. PATENT DOCUMENTS

| 1,576,869 A | 3/1926 | Stevens et al. |
| 6,068,375 A | 5/2000 | LeBrun et al. |
| 6,439,716 B1 | 8/2002 | Ku |
| 2006/0132706 A1 | 6/2006 | Li |
| 2013/0201438 A1* | 8/2013 | Gasparetto .................... 351/153 |

FOREIGN PATENT DOCUMENTS

CN 101493583 7/2009

* cited by examiner

*Primary Examiner* — Hung Dang
(74) *Attorney, Agent, or Firm* — Li & Cai Intellectual Property (USA) Office

(57) ABSTRACT

An eyeglass frame having flexible pivot hinge enabling approximately 180° bending. The frame includes a frame, a temple and a hinge. The frame has a tenon receiving hole and a frame screw hole perpendicular thereto. The temple has a stem receiving hole and a temple screw hole perpendicular thereto. The hinge has a frame joint and a temple joint. The frame joint has a pin seat formed with a bore and a tenon formed with a tenon screw hole. The temple joint has a stem formed with a stem screw hole and ending with substantially U-shaped fork. A channel passes through the two branches of the fork. The instant disclosure includes relatively minimum members for easier maintenance and increased comfortableness.

5 Claims, 7 Drawing Sheets

EYEGLASS FRAME HAVING FLEXIBLE PIVOT HINGE

BACKGROUND

1. Field of the Invention

The instant disclosure relates to a non-optical portion of an eyeglass frame; in particular, to an eyeglass having specialized hinge which enables the temples being turned outwardly to approximately 180°.

2. Description of Related Art

When looking for an eyeglass frame, comfort is the top concern for most eyeglass wearers. Conventional mass production eyeglass frames often have uniform dimension therefore relatively small room for individual adjustment. The temples lie against the face and may create excessive pressure thereon due to the great variety of human face structure. Resilient materials have been employed to provide a more flexible temple. However, the swap of materials accompanies with higher manufacture cost. Alternatively, some structural modification has been implemented to release the stress created by a rigid frame. This type of flexible hinge is, for example, described in CN 101493583, a spectacle frame with spring hinge mechanism. The spectacle frame comprises a spring joint to connect the frame and temple so to allow some degree of flexibility. Nevertheless, the pivotal angle is relatively limited and the spring joint is prone to break if a force is inaccurately applied.

SUMMARY OF THE INVENTION

The object of the instant disclosure is to overcome the aforementioned issues by providing an eyeglass frame having flexible pivot hinge, which enables an approximately 180° turn by a specialized hinge structure.

The eyeglass frame comprises a frame, temples and hinges. The frame is formed with a tenon receiving hole and a frame screw hole perpendicular thereto. The temple is also formed with a stem receiving hole and a temple screw hole perpendicular thereto. The hinge includes a frame joint and a temple joint. The frame joint has a pin seat, which is formed with a through bore, and a tenon with a tenon screw hole whose opens are perpendicular to those of the bore. The temple joint includes a stem formed with a stem screw hole and ending with a U-shaped fork, which has channel penetrating both branches.

Preferably, an elastic member is retained within the stem. The stem is inserted into the stem receiving hole and a screw passes through the temple and the stem screw hole to fasten the stem onto the temple. The pin seat of the frame joint abuts against the elastic member which is flanked by the U-shaped fork. The pin seat and the temple joint are engaged by a pin passing through the channel and bore. The tenon of the frame joint is inserted into the tenon receiving hole of the frame and secured by a screw passing the frame screw hole and tenon screw hole.

The instant disclosure provides the eyeglass frame having flexible pivot hinge by utilizing a two-segment hinge hence allowing temples for being turned approximately 180°. Meanwhile the elastic member is disposed within the hinge to reduce the general volume of the frame and temple. The hinge has the simplicity of small number of elements and therefore involves simpler assembly and repair if needed. Of course, the adjustable temples greatly increase the comfortableness and reduce the stress.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
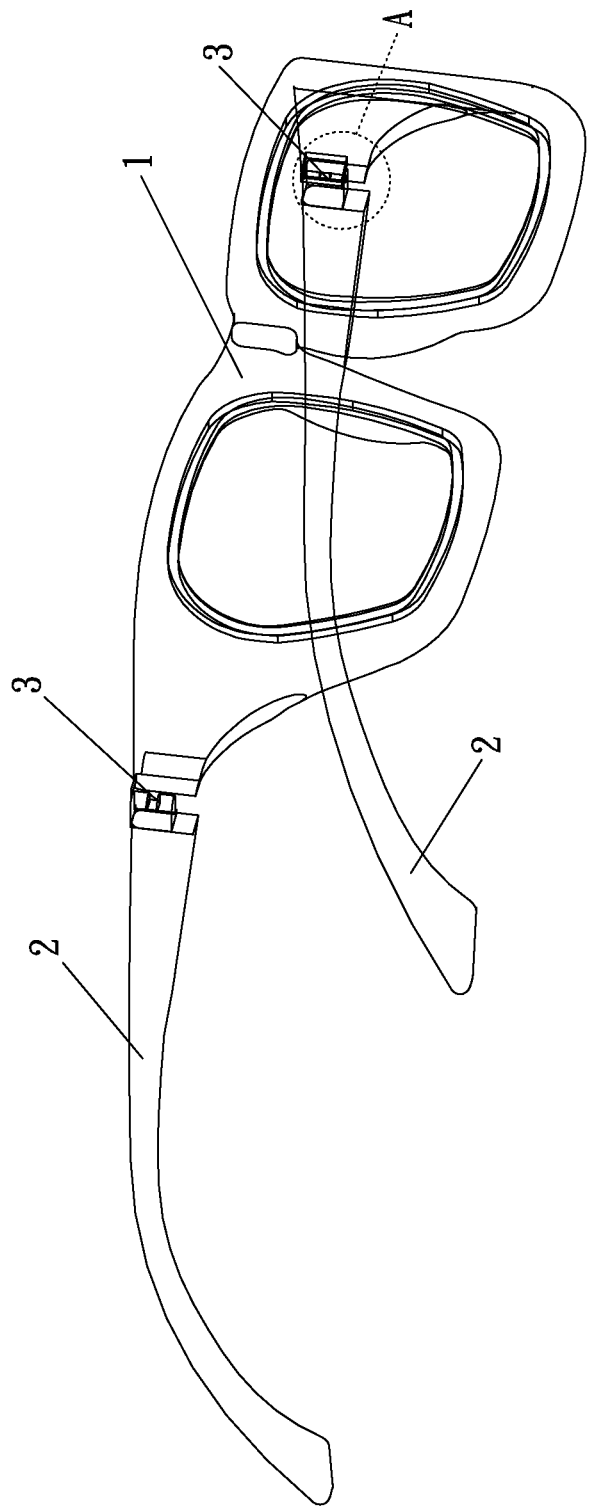
FIG. 1 illustrates a perspective view of an eyeglass frame having flexible pivot hinge in accordance with an embodiment of the instant disclosure.
Figure 2:
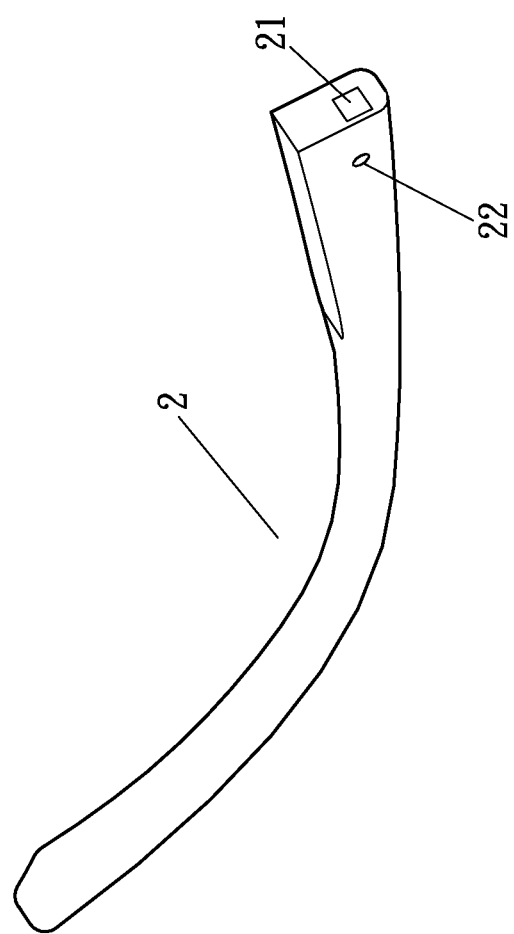
FIG. 2 illustrates a schematic diagram of a temple in accordance with an embodiment of the instant disclosure.
Figure 3:
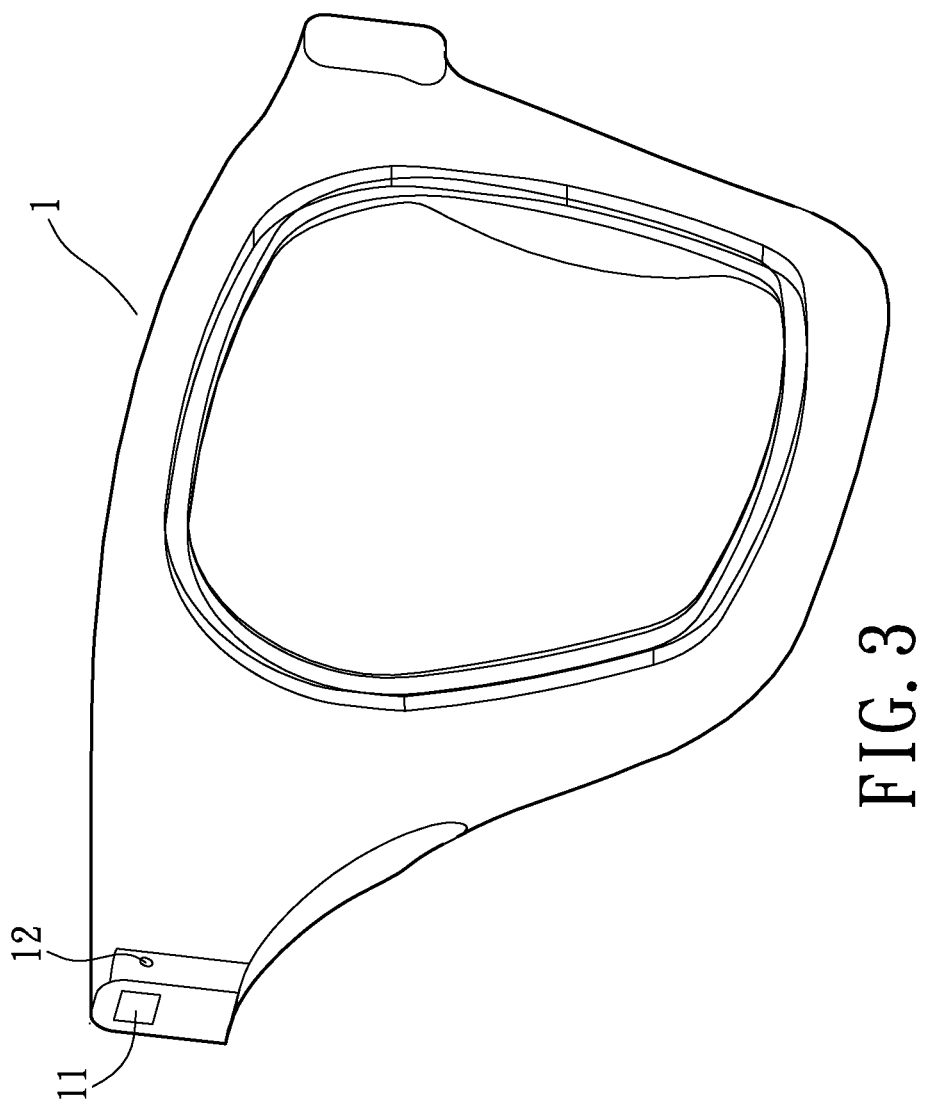
FIG. 3 illustrates a schematic diagram of a frame in accordance with an embodiment of the instant disclosure.
Figure 4:
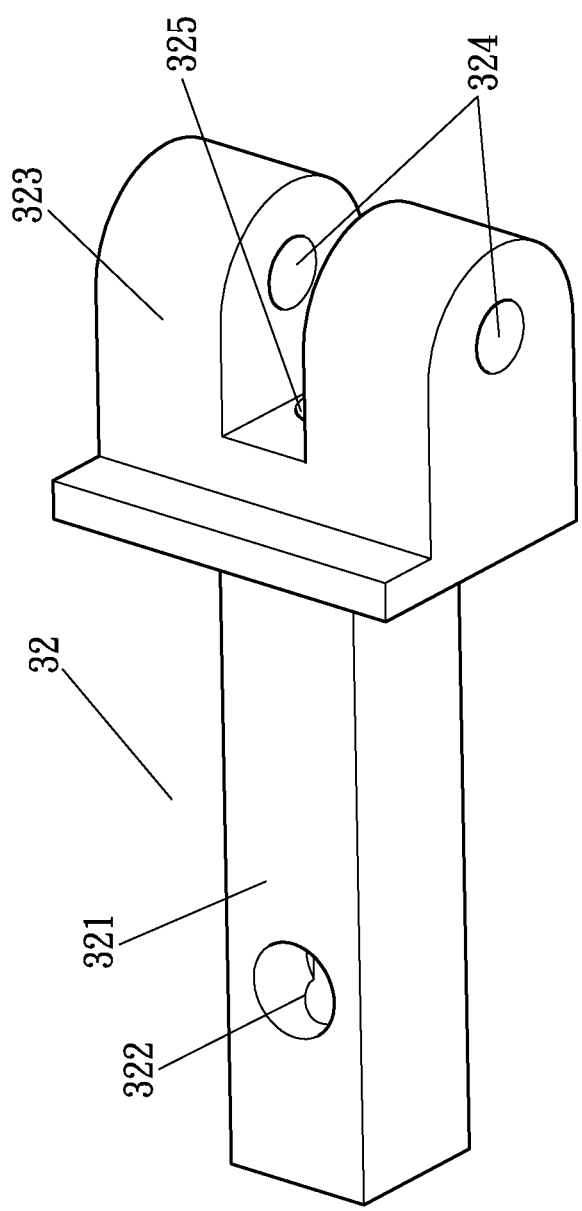
FIG. 4 illustrates a schematic diagram of a stem in accordance with an embodiment of the instant disclosure.
Figure 5:
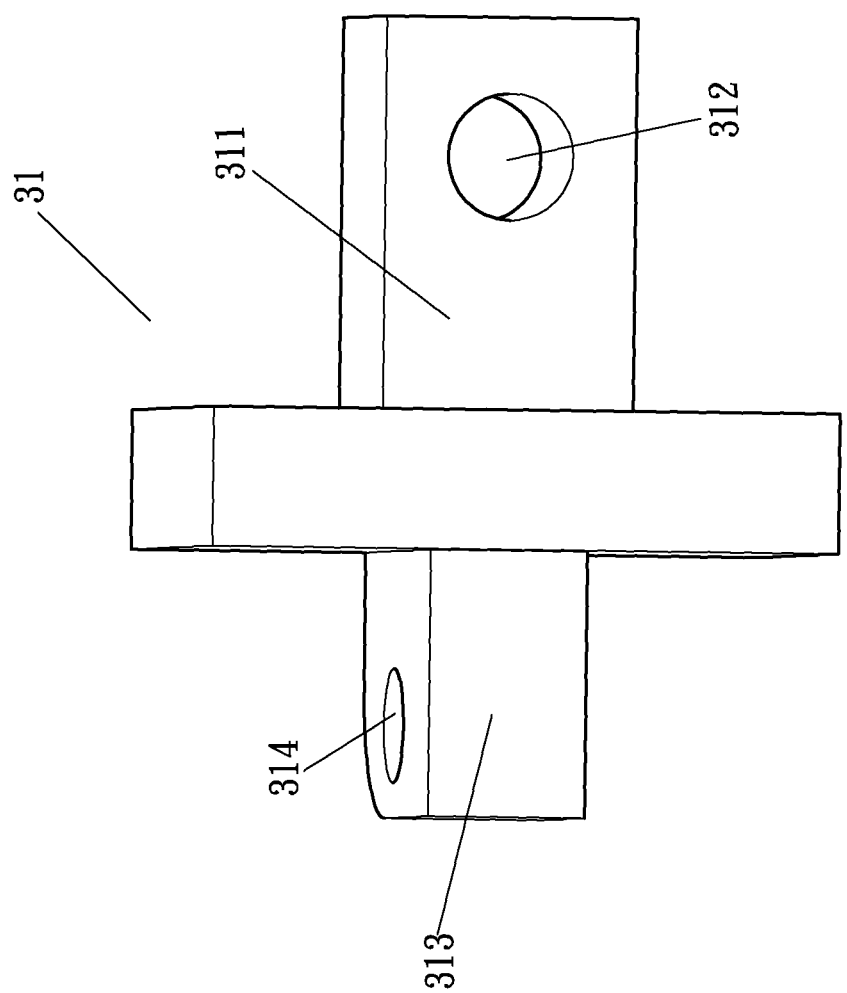
FIG. 5 illustrates a schematic diagram of a pin seat in accordance with an embodiment of the instant disclosure.
Figure 6:
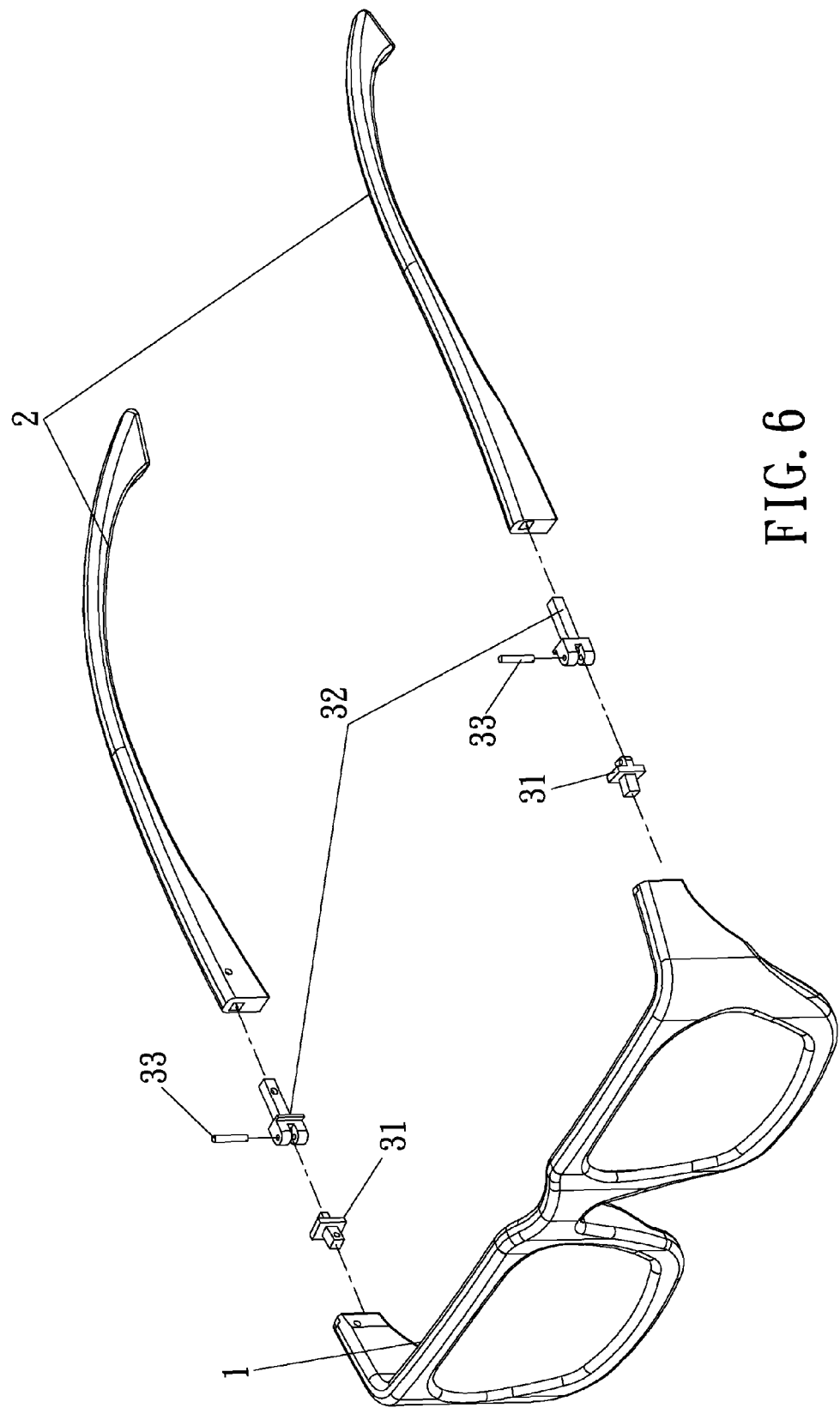
FIG. 6 illustrates an exploded view of an eyeglass frame having flexible pivot hinge in accordance with an embodiment of the instant disclosure.
Figure 7:
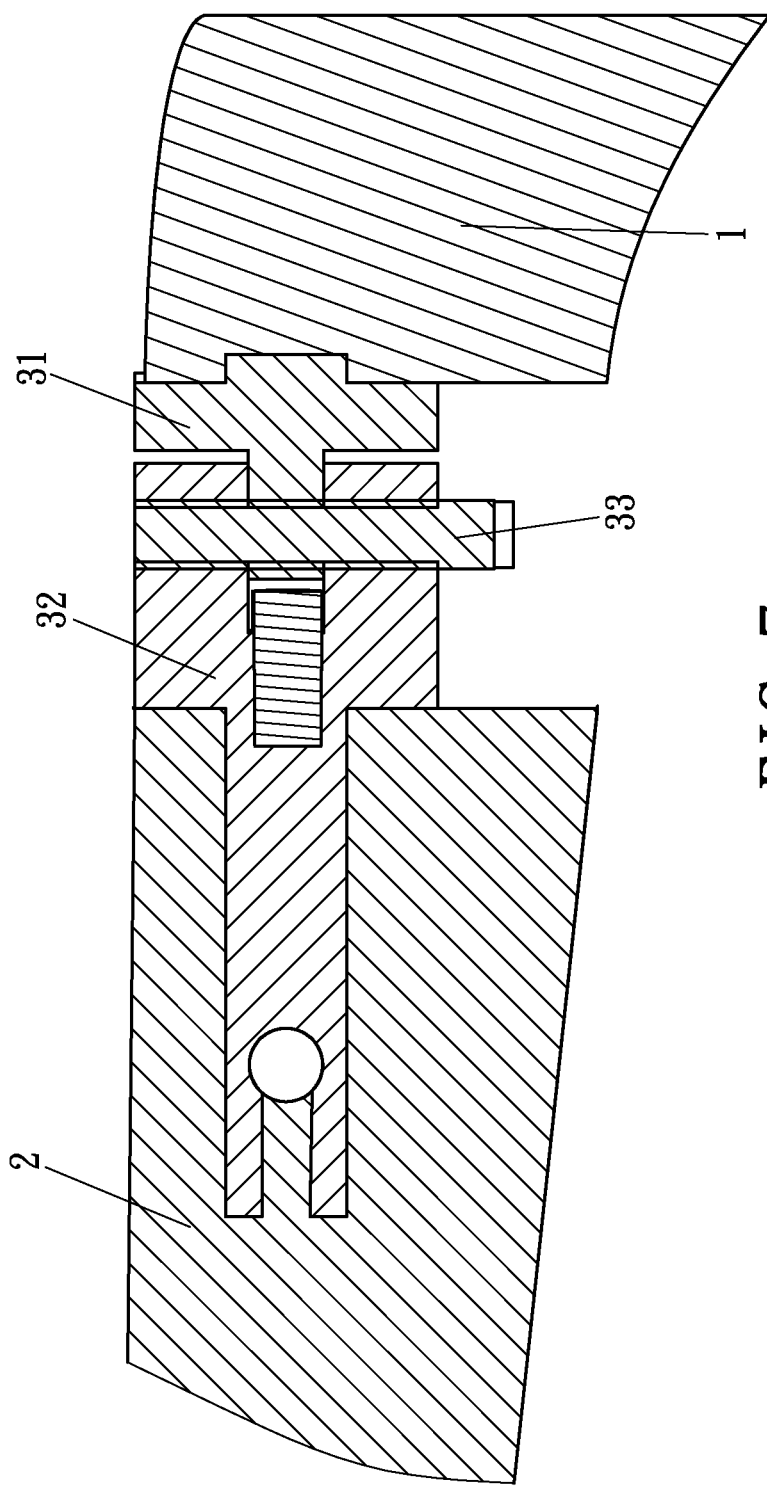
FIG. 7 illustrates a side cross-sectional view of the region A in FIG. 1.

An eyeglass frame having flexible pivot hinge comprises a frame 1, a pair of temples 2 and associated hinges 3. With reference to FIG. 3, each of the connecting edges of the frame 1 is formed with a tenon receiving hole 11 and a frame screw hole 12 substantially perpendicular to the tenon receiving hole 11. Please refer to FIG. 2. The temple 2 is formed with a stem receiving hole 21 and a temple screw hole 22 substantially perpendicular to the stem receiving hole 21. The hinge 3 includes a frame joint 31 and a temple joint 32. With reference to FIG. 5, the frame joint 31 has a pin seat 311, which defines a through bore 312. Opposite to the pin seat 311 is a tenon 313 formed with a tenon screw hole 314. Please refer to FIG. 4. The temple joint 32 includes a partially hollow stem 321 for receiving the elastic member 325. A stem screw hole 322 is formed on one end of the stem 321 and the other end splits into a U-shaped fork 323. A channel 324 penetrates through both branches of the fork 323 for receiving a pin 33. The stem 321 of the temple joint 32 is inserted into the stem receiving hole 21 of the temple 2 and the engagement is secured by a screw passing through the temple 2 to the stem screw hole 322 of the temple joint 32. The pin seat 311 of the frame joint 31 abuts against the elastic member 325 which is in between the two branches of the fork 323. The pin 33 travels through one half of the channel 324, then the bore 312 of the frame joint 31 and finally the other half of the channel 324 to fasten the frame joint 31 and the temple joint 32 together. The tenon 313 of the frame joint 31 is inserted into the tenon receiving hole 11 and a screw is used to lock the frame joint 31 with the frame 1.

In short, the tenon 313 is inserted into the tenon receiving hole and secured by a screw through the frame screw hole 12. The pin seat 311 is flanked by the U-shaped fork 323 and presses against the elastic member 325 which is retained in the temple joint 32. The temple joint 32 connects the frame joint 31 by a pin 33 going through the channel 324 and bore

312. Finally, the stem 321 is inserted into the stem receiving hole 21 of the temple 2 and a screw is received by the temple screw hole 22 and stem screw hole 322 to allow firm attachment. The temple 2 is then freely to pivot to approximately 180° using the pin 33 as the shaft.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An eyeglass frame having flexible pivot hinge, comprising:
    a frame having a tenon receiving hole on the edge and a frame screw hole perpendicularly communicating with the tenon receiving hole;
    a temple having a stem receiving hole and a temple screw hole perpendicularly communicating with the stem receiving hole; and
    a hinge including a frame joint and a temple joint,
        the frame joint including a pin seat formed at one end thereof with a through bore and a tenon formed at the other end with a tenon screw hole,
        the temple joint including a stem formed at one end with a stem screw hole arranged on a side surface thereof and a substantially U-shaped fork formed at the other end having a channel passing there-through.

2. The eyeglass frame having flexible pivot hinge according to claim 1, wherein the stem is substantially hollow for receiving an elastic member therein from the fork end.

3. The eyeglass frame having flexible pivot hinge according to claim 1, wherein the stem is disposed in the stem receiving hole and fastened by a screw going through the temple screw hole and stem screw hole.

4. The eyeglass frame having flexible pivot hinge according to claim 1, wherein the pin seat is fittingly flanked by the fork and a pin passes through the channel and bore to engage the frame joint and temple joint.

5. The eyeglass frame having flexible pivot hinge according to claim 1, wherein the tenon is disposed in the tenon receiving hole and fastened by a screw passing through the frame screw hole and tenon screw hole.

\* \* \* \* \*